US006316561B1

(12) United States Patent
Kanzawa

(10) Patent No.: US 6,316,561 B1
(45) Date of Patent: Nov. 13, 2001

(54) PROCESS FOR PRODUCING OLEFIN POLYMERS

(75) Inventor: Mitsugu Kanzawa, Sodegaura (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/381,279

(22) PCT Filed: Mar. 23, 1998

(86) PCT No.: PCT/JP98/01236

§ 371 Date: Oct. 26, 1999

§ 102(e) Date: Oct. 26, 1999

(87) PCT Pub. No.: WO98/42757

PCT Pub. Date: Oct. 1, 1998

(30) Foreign Application Priority Data

Mar. 21, 1997 (JP) .................................................. 9-067966

(51) Int. Cl.[7] ........................................................ C08F 4/52
(52) U.S. Cl. ...................... 526/160; 526/127; 526/170; 526/128; 526/129; 526/172; 502/117; 502/152; 502/155
(58) Field of Search .................................... 526/127, 160, 526/170, 128, 129, 172; 502/117, 152, 155

(56) References Cited

U.S. PATENT DOCUMENTS

| | | | | |
|---|---|---|---|---|
| 4,981,929 | * | 1/1991 | Hussein et al. ....................... | 526/125 |
| 5,854,165 | * | 12/1998 | Yabunouchi et al. ................ | 502/117 |
| 5,869,417 | * | 2/1999 | Woo et al. ............................ | 502/107 |

* cited by examiner

Primary Examiner—David W. Wu
Assistant Examiner—William K Cheung
(74) Attorney, Agent, or Firm—Oblon, Spivak, McClelland, Maier & Neustadt, P.C.

(57) ABSTRACT

In olefin polymer production, for which is used a metallocene-type catalyst having a double-crosslinked indenyl or substituted indenyl group, a small amount of hydrogen is added to the polymerization system. Concretely, hydrogen is added thereto so that the hydrogen concentration in the olefin being polymerized could be from 0.01 to 10 mol % or hydrogen could be in the polymerization system in an amount of from 10 to 20000 mols relative to one mol of the transition metal in the metallocene-type catalyst. Hydrogen added to the olefin polymer production system enhances the polymerization activity of the catalyst used, and the catalyst could exhibit high activity in the presence of hydrogen.

29 Claims, No Drawings

PROCESS FOR PRODUCING OLEFIN POLYMERS

TECHNICAL FIELD

The present invention relates to a method for producing olefinic polymers. More precisely, it relates to a method for producing olefinic polymers, which is characterized in that a small amount of hydrogen is added to the polymerization system and olefins are polymerized in the presence of hydrogen.

BACKGROUND OF THE INVENTION

Improving the polymerization activity of catalysts in olefinic polymer production leads to the reduction in production costs, for which various studies have heretofore been made.

For example, H. H. Brintzinger (J. Polym. Sci.: Part A, Polym. Chem., Vol. 33, 1305–1317 (1995)) and S. Kojoh, et al. (Polymer, Vol. 36, No. 26, 5015–5018 (1995)) say that the activity of catalysts could be increased by controlling the hydrogen concentration in the polymerization system to fall between 3 and 20 mol % or so. Regarding its effect, however, hydrogen added could increase the catalyst activity at most 1.7 times or so, as compared with that in the absence of hydrogen.

On the other hand, known is a method of adding hydrogen that serves as a chain transfer agent, to the polymerization system in olefinic polymer production so as to control the molecular weight of the olefinic polymers produced. The method is employed in industrial-scale olefinic polymer production for which the catalyst used is typically an Mg—Ti-based, composite-type solid catalyst, and also in olefinic polymer production for which is used a metallocene-type catalyst being widely noticed in the art.

For example, in Japanese Patent Laid-Open No. 184179/1994, hydrogen is added to the olefin polymerization system for the purpose of controlling the molecular weight of the olefin polymer produced and/or enhancing the activity of the catalyst used. In its Examples, a metallocene-type catalyst having a single-crosslinked ligand of substituted indenyl groups as crosslinked at their 1-position is used for propylene polymerization, and hydrogen is added to the polymerization system whereby the activity of the catalyst used is enhanced. Regarding its effect, however, hydrogen added could increase the catalyst activity at most 2 times or so, as compared with that in the absence of hydrogen.

In International Patent Laid-Open No. WO96/30380, it is written that the activity of the catalyst used increases with the increase in the amount of hydrogen added to the polymerization system.

In the techniques noted above, the amount of hydrogen to be added to the polymerization system is large, relative to the amount of the olefin to be polymerized. In those, however, the effect of hydrogen added for activating the polymerization system is not large, and the absolute value of the polymerization activity could not be enlarged so much.

Given that situation, the object of the present invention is to provide a method for producing olefin polymers in which the polymerization activity of the catalyst used can be enhanced in a simplified manner and the catalyst used can therefore exhibit high activity.

DISCLOSURE OF THE INVENTION

We, the present inventors have assiduously studied so as to attain the object noted above, and, as a result, have found that, when a metallocene-type catalyst having a double-crosslinked ligand of indenyl or substituted indenyl groups is used in olefin polymerization and when hydrogen is added to the polymerization system, then the polymerization activity of the catalyst can be increased several times or more even though the amount of hydrogen added is smaller than previously, and the catalyst can therefore exhibit much higher polymerization activity. On the basis of this finding, we have completed the present invention.

Specifically, the invention provides a method for producing olefin polymers by polymerizing an olefin in the presence of a metallocene-type catalyst that comprises (A) a double-crosslinked transition metal compound having a structure of a general formula (I):

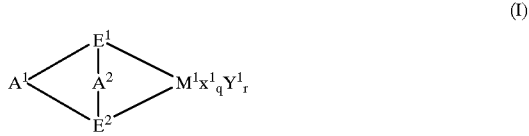

where
  $M^1$ represents a metal element of Group 4 of the Periodic Table;
  $E^1$ and $E^2$ each represent a ligand of an indenyl or substituted indenyl group, and form a crosslinked structure via $A^1$ and $A^2_1$, and $E^1$ and $E^2$ may be the same or different;
  $X^1$ represents a σ-bonding ligand, and plural $X^1$'s, if any, may be the same or different;
  $Y^1$ represents a Lewis base;
  $A^1$ and $A^2$ each represent a crosslinking group, and they may be the same or different, but at least one of them is a hydrocarbon group;
  q represents an integer of 1 or 2, and r represents an integer of 0 or 1,
and (B) a compound capable of reacting with the transition metal compound (A) or its derivative to form an ionic complex; wherein the polymerization system is so controlled that the hydrogen concentration in the olefin therein falls between 0.01 and 10 mol %. In preferred embodiments of the method, $E^1$ and $E^2$ in formula (I) are substituted indenyl groups, and $A^1$ and $A^2$ therein are hydrocarbon groups.

The invention also provides a method for producing olefin polymers by polymerizing an olefin in the presence of a metallocene-type catalyst that comprises (A) a double-crosslinked transition metal compound having a structure of a general formula (I):

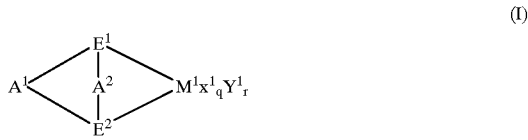

where
  $M^1$ represents a metal element of Group 4 of the Periodic Table;
  $E^1$ and $E^2$ each represent a ligand of an indenyl or substituted indenyl group, and form a crosslinked structure via $A^1$ and $A^2$, and $E^1$ and $E^2$ may be the same or different;
  $X^1$ represents a σ-bonding ligand, and plural $X^1$'s, if any, may be the same or different;

$Y^1$ represents a Lewis base;

$A^1$ and $A^2$ each represent a crosslinking group, and they may be the same or different, but at least one of them is a hydrocarbon group;

q represents an integer of 1 or 2, and r represents an integer of 0 or 1, and (B) a compound capable of reacting with the transition metal compound (A) or its derivative to form an ionic complex; wherein hydrogen is added to the polymerization system in an amount of from 10 to 20000 mols relative to one mol of the transition metal in the transition metal compound. In preferred embodiments of the method, $E^1$ and $E^2$ in formula (I) are substituted indenyl groups, and $A^1$ and $A^2$ therein are hydrocarbon groups.

The invention still provides a method for producing olefin polymers by polymerizing an olefin in the presence of a metallocene-type catalyst that comprises (A) a double-crosslinked transition metal compound having a structure of a general formula (I):

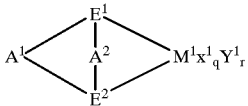
(I)

where $M^1$ represents a metal element of Group 4 of the Periodic Table;

$E^1$ and $E^2$ each represent a ligand of an indenyl or substituted indenyl group, and form a crosslinked structure via $A^1$ and $A^2$, and $E^1$ and $E^2$ may be the same or different;

$X^1$ represents a σ-bonding ligand, and plural $X^1$'s, if any, may be the same or different;

$Y^1$ represents a Lewis base;

$A^1$ and $A^2$ each represent a crosslinking group, and they may be the same or different, but at least one of them is a hydrocarbon group;

q represents an integer of 1 or 2, and r represents an integer of 0 or 1, and (B) a compound capable of reacting with the transition metal compound (A) or its derivative to form an ionic complex, and in the presence of from 0.01 to 10 mol %, relative to the amount of the olefin existing in the reaction system, of hydrogen. In preferred embodiments of the method, $E^1$ and $E^2$ in formula (I) are substituted indenyl groups, and $A^1$ and $A^2$ therein are hydrocarbon groups.

The invention still provides a method for producing olefin polymers by polymerizing an olefin in the presence of a metallocene-type catalyst that comprises (A) a double-crosslinked transition metal compound having a structure of a general formula (I):

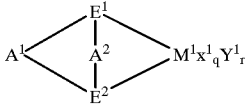
(I)

where $M^1$ represents a metal element of Group 4 of the Periodic Table;

$E^1$ and $E^2$ each represent a ligand of an indenyl or substituted indenyl group, and form a crosslinked structure via $A^1$ and $A^2$, and $E^1$ and $E^2$ may be the same or different;

$X^1$ represents a σ-bonding ligand, and plural $X^1$'s, if any, may be the same or different;

$Y^1$ represents a Lewis base;

$A^1$ and $A^2$ each represent a crosslinking group, and they may be the same or different, but at least one of them is a hydrocarbon group;

q represents an integer of 1 or 2, and r represents an integer of 0 or 1, and (B) a compound capable of reacting with the transition metal compound (A) or its derivative to form an ionic complex, and in the presence of from 10 to 20000 mols, relative to one mol of the transition metal in the transition metal compound, of hydrogen. In preferred embodiments of the method, $E^1$ and $E^2$ in formula (I) are substituted indenyl groups, and $A^1$ and $A^2$ therein are hydrocarbon groups.

BEST MODE FOR CARRYING OUT THE INVENTION

The method for producing olefin polymers of the invention is of polymerizing an olefin in the presence of a metallocene-type catalyst that comprises (A) a double-crosslinked transition metal compound having a structure of a general formula (I):

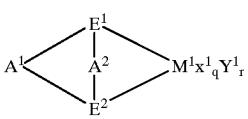
(I)

where $M^1$ represents a metal element of Group 4 of the Periodic Table;

$E^1$ and $E^2$ each represent a ligand of an indenyl or substituted indenyl group, and form a crosslinked structure via $A^1$ and $A^2$, and $E^1$ and $E^2$ may be the same or different;

$X^1$ represents a σ-bonding ligand, and plural $X^1$'s, if any, may be the same or different;

$Y^1$ represents a Lewis base;

$A^1$ and $A^2$ each represent a crosslinking group, and they may be the same or different, but at least one of them is a hydrocarbon group;

q represents an integer of 1 or 2, and r represents an integer of 0 or 1, and (B) a compound capable of reacting with the transition metal compound (A) or its derivative to form an ionic complex, and is characterized in that a small amount of hydrogen is added to the polymerization system.

The invention is also characterized in that an olefin is polymerized in the presence of the catalyst comprising the compounds (A) and (B) noted above and of a small amount of hydrogen.

Adding a small amount of hydrogen to the polymerization system in the presence of the catalyst noted above, or making a small amount of hydrogen present in that polymerization system greatly enhances the catalyst activity several times or more. More suitably selecting the preferred catalyst combination and the preferred condition for the polymerization further enhances the catalyst activity 15 times or more. Concretely, in the preferred case, extremely high activity can be attained to give 10 tons-olefin polymer/g-M.hr (where M indicates the transition metal in the catalyst used). In this respect, the method for producing olefins of the invention is better than any other conventional methods.

In the invention, the amount of hydrogen to be added to the polymerization system, or the amount of hydrogen to be present in the polymerization system shall be such that the hydrogen concentration in the olefin in the system falls between 0.01 and 10 mol %, or falls between 10 and 20000 mols relative to one mol of the transition metal in the transition metal compound.

Preferably, the hydrogen concentration in the olefin in the polymerization system is from 0.01 to 5 mol %, more preferably from 0.01 to 1 mol %. If it is larger than 10 mol %, the molecular weight of the polymer produced will be greatly lowered. If, on the other hand, it is smaller than 0.01 mol %, the intended activity-enhancing effect could not be attained.

Also preferably, the amount of hydrogen to be in the polymerization system is from 10 to 5000 mols, more preferably from 10 to 2500 mols, relative to one mol of the transition metal in the transition metal compound. If it is larger than 20000 mols, the molecular weight of the polymer produced will be greatly lowered. If, on the other hand, it is smaller than 10 mols, the intended activity-enhancing effect could not be attained.

The optimum value of the hydrogen concentration varies in some degree, depending on the individual catalysts used and others. Anyhow, however, hydrogen to be in the polymerization system is so controlled that the hydrogen concentration in the olefin in the system falls between 0.01 and 10 mol %, or the amount of hydrogen in the system falls between 10 and 20000 mols relative to one mol of the transition metal of the transition metal compound in the catalyst used.

For adding a small amount of hydrogen to the polymerization system or for making a small amount of hydrogen present in the system, employable is any method of adding hydrogen to the starting olefin so as to introduce hydrogen into the reaction system along with the olefin, or dissolving hydrogen in a solvent for solution polymerization or the like and using the solvent thus containing hydrogen dissolved therein, or introducing a hydrogen stream into the solvent.

The transition metal compound (A) to be used in the invention is a double-crosslinked transition metal compound having a structure of a general formula (I):

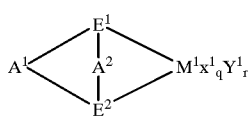

(I)

In formula (I), $M^1$ represents a metal element of Group 4 of the Periodic Table, including, for example, titanium, zirconium, hafnium, etc. Of those, preferred is zirconium in view of the olefin polymerization activity of the catalyst.

$E^1$ and $E^2$ each represent a ligand of an indenyl or substituted indenyl group, and form a crosslinked structure via $A^1$ and $A^2$. $E^1$ and $E^2$ may be the same or different. As $E^1$ and $E^2$, preferred are substituted indenyl groups. The substituents for the groups include a methyl group, an ethyl group, a propyl group, an isopropyl group, a butyl group, etc. The substituents may be bonded to each other to form a cyclic structure.

$X^1$ represents a σ-bonding ligand, including, for example, a halogen atom, a hydrocarbon group having from 1 to 20 carbon atoms, an alkoxy group having from 1 to 20 carbon atoms, an aryloxy group having from 6 to 20 carbon atoms, an amido group having from 1 to 20 carbon atoms, a silicon-containing group having from 1 to 20 carbon atoms, a phosphide group having from 1 to 20 carbon atoms, a sulfide group having from 1 to 20 carbon atoms, an acyl group having from 1 to 20 carbon atoms, etc. Of those, preferred are halogen atoms, such as chlorine, bromine, and iodine atoms. Especially preferred is a chlorine atom. Plural $X^1$'s, if any, may be the same or different.

$Y^1$ represents a Lewis base, including, for example, amines, ethers, phosphines, thioethers, etc.

q represents an integer of 1 or 2, and r represents an integer of 0 or 1. In general, q and r satisfy the relationship of q+r=2.

$A^1$ and $A^2$ each represent a crosslinking group, and they may be the same or different, but at least one of them is a hydrocarbon group. Preferably, these are to crosslink the ligands of indenyl or substituted indenyl groups at their 1- or 2-position.

One example of the crosslinking group is a hydrocarbon group of a general formula:

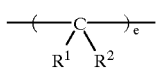

wherein $R^1$ and $R^2$ each represent a hydrogen atom, or a hydrocarbon group having from 1 to 20 carbon atoms, and these may be the same or different, or may be bonded to each other to form a cyclic structure; and e represents an integer of from 1 to 4. It includes, for example, a methylene group, an ethylene group, an ethylidene group, a propylidene group, an isopropylydene group, a cyclohexylidene group, a 1,2-cyclohexylene group, a vinylidene group ($CH_2$=C=), etc. As other examples of the crosslinking group for $A^1$ or $A^2$, mentioned are $R^3{}_2Si$, $R^3{}_2Ge$, $R^3{}_2Sn$ (where $R^3$ represents a hydrogen atom, a halogen atom, a hydrocarbon group having from 1 to 20 carbon atoms, a halogen-containing hydrocarbon group having from 1 to 20 carbon atoms; and two $R^3$'s, if any, may be the same or different), etc. Of those, preferred are a methylene group, an ethylene group, an isopropylidene group, and $R^3{}_2Si$. More preferred is an ethylene group.

In the transition metal compound of formula (I), the bonding mode of the crosslinking groups of $A^1$ and $A^2$ may be of any type of double-crosslinking (1,1')(2,2') or double-crosslinking (1,2')(2,1').

Specific examples of the transition metal compound of formula (I) for use in the invention include (1,1'-ethylene)(2,2'-ethylene)-bis(indenyl)zirconium dichloride, (1,2'-ethylene)(2,1'-ethylene)-bis(indenyl)zirconium dichloride, (1,1'-methylene)(2,2'-methylene)-bis(indenyl)zirconium dichloride, (1,2'-methylene)(2,1'-methylene)-bis(indenyl) zirconium dichloride, (1,1'-isopropylidene)(2,2'-isopropylidene)-bis(indenyl)zirconium dichloride, (1,2'-isopropylidene)(2,1'-isopropylidene)-bis(indenyl)zirconium dichloride, (1,1'-ethylene)(2,2'-isopropylidene)-bis(indenyl) zirconium dichloride, (1,2'-ethylene)(2,1'-isopropylidene)-bis(indenyl)zirconium dichloride, (1,1'-isopropylidene)(2, 2'-ethylene)-bis(indenyl)zirconium dichloride, (1,2'-methylene)(2,1'-ethylene)-bis(indenyl)zirconium dichloride, (1,1'-methylene) (2,2 '-ethylene)-bis(indenyl) zirconium dichloride, (1,1'-ethylene)(2,2'-methylene)-bis (indenyl)zirconium dichloride, (1,1'-methylene)(2,2'-isopropylidene)-bis(indenyl)zirconium dichloride, (1,2'-methylene)(2,1'-isopropylidene)-bis(indenyl)zirconium dichloride, (1,1'-isopropylidene)(2,2'-methylene)-bis (indenyl)zirconium dichloride, (1,1'-ethylene)(2,2'-ethylene)-bis(3-methylindenyl)zirconium dichloride, (1,2'- ethylene)(2,1'-ethylene)-bis(3-methylindenyl)zirconium dichloride, (1,1'-ethylene)(2,2'-ethylene)-bis(4,7-dimethylindenyl)zirconium dichloride, (1,2'-ethylene)(2,1'-ethylene)-bis(4,7-dimethylindenyl)zirconium dichloride, (1,1'-ethylene)(2,2'-ethylene)-bis(4,5-benzindenyl) zirconium dichloride, (1,2'-ethylene)(2,1'-ethylene)-bis(4,5-benzindenyl)zirconium dichloride, (1,1'-ethylene)(2,2'-ethylene)-bis(6-t-butylindenyl)zirconium dichloride, (1,2'-ethylene)(2,1'-ethylene)-bis(6-t-butylindenyl)zirconium dichloride, (1,1'-ethylene)(2,2'-ethylene)-bis(5-t-butylindenyl)zirconium dichloride, (1,2'-ethylene)(2,1'-ethylene)-bis(5-t-butylindenyl)zirconium dichloride, (1,1'-ethylene)(2,2'-ethylene)-bis(4-isopropylindenyl)zirconium dichloride, (1,2'-ethylene)(2,1'-ethylene)-bis(4-isopropylindenyl)zirconium dichloride, (1,1'-ethylene)(2,2'-ethylene)-bis(5,6-dimethylindenyl)zirconium dichloride, (1,2'-ethylene)(2,1'-ethylene)-bis(5,6-dimethylindenyl) zirconium dichloride, (1,1'-ethylene)(2,2'-ethylene)-bis(4,7-diisopropylindenyl)zirconium dichloride, (1,2'-ethylene)(2,1'-ethylene)-bis(4,7-diisopropylindenyl)zirconium dichloride, (1,1'-ethylene)(2,2'-ethylene)-bis(4-phenylindenyl)zirconium dichloride, (1,2'-ethylene)(2,1'-ethylene)-bis(4-phenylindenyl)zirconium dichloride, (1,1'-ethylene)(2,2'-ethylene)-bis(3-methyl-4-isopropylindenyl) zirconium dichloride, (1,2'-ethylene)(2,1'-ethylene)-bis(3-methyl-4-isopropylindenyl)zirconium dichloride, (1,1'-ethylene)(2,2'-ethylene)-bis(5,6-benzindenyl)zirconium-dichloride, (1,2'-ethylene)(2,1'-ethylene)-bis(5,6-benzindenyl)zirconium dichloride, etc.; and derivatives of those compounds having titanium or hafnium in place of zirconium. They further include (1,1'-ethylene)(2,2'-dimethylsilylene)-bis(indenyl)zirconium dichloride, (1,2'-ethylene)(2,1'-dimethylsilylene)-bis(indenyl)zirconium dichloride, (1,1'-methylene)(2,2'-dimethylsilylene)-bis (indenyl)zirconium dichloride, (1,2'-methylene)(2,1'-dimethylsilylene)-bis(indenyl)zirconium dichloride, (1,1'-ethylene)(2,2'-dimethylsilylene)-bis(3-methylindenyl) zirconium dichloride, (1,2'-ethylene)(2,1'-dimethylsilylene)-bis(3-methylindenyl)zirconium dichloride, (1,1'-ethylene) (2,2'-dimethylsilylene)-bis(4,7-dimethylindenyl)zirconium dichloride, (1,2'-ethylene)(2,1'-dimethylsilylene)-bis(4,7-dimethylindenyl)zirconium dichloride, (1,1'-ethylene)(2,2'-dimethylsilylene)-bis(4,5-benzindenyl)zirconium dichloride, (1,2'-ethylene)(2,1'-dimethylsilylene)-bis(4,5-benzindenyl)zirconium dichloride, (1,1'-ethylene)(2,2'-dimethylsilylene)-bis(5,6-benzindenyl)zirconium dichloride, (1,2'-ethylene)(2,1'-dimethylsilylene)-bis(5,6-benzindenyl)zirconium dichloride, etc.; and derivatives of those compounds having titanium or hafnium in place of zirconium.

Of the compounds noted above, preferred are those where $E^1$ or $E^2$ is a substituted indenyl group. More preferred are those having a double-crosslinking combination of (1,2'-ethylene)(2,1'-ethylene).

One or more of such transition metal compounds may be used for the component (A), either singly or as combined. The compound (B) for use in the invention, which can react with the transition metal compound or its derivative of (A) to form an ionic complex, includes (B-1) an ionic compound capable of reacting with the transition metal compound (A) to form an ionic complex, (B-2) an aluminoxane, and (B-3) a Lewis acid.

The component (B-1) may be any and every ionic compound capable of reacting with the transition metal compound (A) to form an ionic complex, but preferred are ionic compounds of the following general formulae (II) and (III):

  (II)

  (III)

wherein $L^2$ represents $M^3$, $R^5R^6M^4$, $R^7{}_3C$, or $R^8M^4$.

In formulae (II) and (III), $L^1$ represents a Lewis base, and $[Z]^-$ represents a non-coordinating anion $[Z^1]^-$ or $[Z^2]^-$. $[Z^1]^-$ is an anion with plural groups bonding to an element, which may be represented by $[M^2G^1G^2\ldots G^f]^-$. In this, $M^2$ represents an element of Groups 5 to 15 of the Periodic Table, preferably an element of Groups 13 to 15 of the Periodic Table. $G^1$ to $G^f$ each represent a hydrogen atom, a halogen atom, an alkyl group having from 1 to 20 carbon atoms, a dialkylamino group having from 2 to 40 carbon atoms, an alkoxy group having from 1 to 20 carbon atoms, an aryl group having from 6 to 20 carbon atoms, an aryloxy group having from 6 to 20 carbon atoms, an alkylaryl group having from 7 to 40 carbon atoms, an arylalkyl group having from 7 to 40 carbon atoms, a halogen-substituted hydrocarbon group having from 1 to 20 carbon atoms, an acyloxy group having from 1 to 20 carbon atoms, an organic metalloid group, or a hetero atom-having hydrocarbon group having from 2 to 20 carbon atoms. Two or more of $G^1$ to $G^f$ may form a ring. f represents an integer of [(valence of the center metal $M^2$)+1]. $[Z^2]^-$ is a conjugate base for a single Brönsted acid of which the logarithmic number of the reciprocal of the acid dissociation constant (pKa) is not larger than −10, or for a combination of such a Brönsted acid and a Lewis acid, or is a conjugate base for an acid that is generally defined as an ultra-strong acid. If desired, it may be coordinated with a Lewis base. $R^4$ represents a hydrogen atom, an alkyl group having from 1 to 20 carbon atoms, an aryl group having from 6 to 20 carbon atoms, an alkylaryl group, or an arylalkyl group. $R^5$ and $R^6$ each represent a cyclopentadienyl group, a substituted cyclopentadienyl group, an indenyl group, or a fluorenyl group. $R^7$ represents an alkyl group having from 1 to 20 carbon atoms, an aryl group, an alkylaryl group, or an arylalkyl group. $R^8$ represents a macrocyclic ligand of, for example, tetraphenylporphyrin, phthalocyanine, etc. k indicates the ionic valence of $[L^1—R^4]$ or $[L^2]$, and is an integer of from 1 to 3. a is an integer of 1 or more, and b=(k×a). $M^3$ includes elements of Groups 1 to 3, 11 to 13, and 17 of the Periodic Table; and $M^4$ represents an element of Groups 7 to 12 of the Periodic Table.

Specific examples of $L^1$ include ammonia; amines such as methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, p-nitro-N,N-dimethylaniline, etc.; phosphines such as triethylphosphine, triphenylphosphine, diphenylphosphine, etc.; thioethers such as tetrahydrothiophene, etc.; esters such as ethyl benzoate, etc.; nitrites such as acetonitrile, benzonitrile, etc.

Specific examples of $R^4$ include a hydrogen atom, a methyl group, an ethyl group, a benzyl group, a trityl group, etc. Specific examples of $R^5$ and $R^6$ include a cyclopentadienyl group, a methylcyclopentadienyl group, an ethylcyclopentadienyl group, a pentamethylcyclopentadienyl group, etc. Specific examples of $R^7$ include a phenyl group, a p-tolyl group, a p-methoxyphenyl group, etc. Specific examples of $R^8$ include tetraphenylporphine, phthalocyanine, allyl, methallyl, etc. Specific examples of $M^3$ include Li, Na, K, Ag, Cu, Br, I, I3, etc. Specific examples of $M^4$ include Mn, Fe, Co, Ni, Zn, etc.

In $[Z^1]^-$ of $[M^2G^1G^2\ldots G^f]$, specific examples of $M^2$ include B, Al, Si, P, As, Sb, etc. For $M^2$, preferred are B and Al. Specific examples of the dialkylamino group for $G^1$, $G^2$ to $G^f$ include a dimethylamino group, a diethylamino group, etc.; those of the alkoxy group and the aryloxy group for them include a methoxy group, an ethoxy group, an n-butoxy group, a phenoxy group, etc.; those of the hydrocarbon groups for them include a methyl group, an ethyl group, an n-propyl group, an isopropyl group, an n-butyl group, an isobutyl group, an n-octyl group, an n-eicosyl group, a phenyl group, a p-tolyl group, a benzyl group, a 4-t-butylphenyl group, a 3,5-dimethylphenyl group, etc.; those of the halogen atom for them include fluorine, chlorine, bromine and iodine atoms; those of the hetero atom-having hydrocarbon group for them include a p-fluorophenyl group, a 3,5-difluorophenyl group, a pentachlorophenyl group, a 3,4,5-trifluorophenyl group, a pentafluorophenyl group, a 3,5-bis(trifluoromethyl)phenyl group, a bis(trimethylsilyl)methyl group, etc.; those of the organic metalloid groups for them include a pentamethylantimonyl group, a trimethylsilyl group, a trimethylgermyl group, diphenylarsinyl group, dicyclohexylantimonyl group, a diphenylboryl group, etc.

Specific examples of the non-coordinating anion for $[Z^2]^-$, which is a conjugate base for a single Brönsted acid having pKa of not larger than −10, or for a combination of such a Brönsted acid and a Lewis acid, include a trifluoromethanesulfonate anion $(CF_3SO_3)^-$, a bis(trifluoromethanesulfonyl)methyl anion, a bis(trifluoromethanesulfonyl)benzyl anion, a bis(trifluoromethanesulfonyl)amido anion, a perchlorate anion $(ClO_4)^-$, a trifluoroacetate anion $(CF_3CO_2)^-$, a hexafluoroantimonyl anion $(SbF_6)^-$, a fluorosulfonate anion $(FSO_3)^-$, a chlorosulfonate anion $(ClSO_3)^-$, a fluorosulfonate/5-fluoroantimonyl anion $(FSO_3/SbF_5)^-$, a fluorosulfonate/5-fluoroarsenyl anion $(FSO_3/AsF_5)^-$, a trifluoromethanesulfonate/5-fluoroantimonyl anion $(CF_3SO_3/SbF_5)^-$, etc.

Specific examples of the ionic compound of the component (B-1) capable of reacting with the transition metal compound (A) to form an ionic complex include triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl (tri-n-butyl)ammonium tetrakis (pentafluorophenyl)borate, methyldiphenylammonium tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl (2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrin-manganese tetraphenylborate, ferrocenium tetrakis(pentafluorophenyl)borate, (1,1'-dimethylferrocenium) tetrakis (pentafluorophenyl)borate, decamethylferrocenium tetrakis (pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenylporphyrin-manganese tetrakis(pentafluorophenyl)borate, silver tetrafluoroborate, silver hexafluorophosphate, silver hexafluoroarsenate, silver perchlorate, silver trifluoroacetate, silver trifluoromethanesulfonate, etc.

One or more of these ionic compounds for the component (B-1), which can react with the transition metal compound of the component (A) to form ionic complexes, may be used herein either singly or as combined.

The aluminoxane for the component (B-2) includes linear aluminoxanes of a general formula (IV):

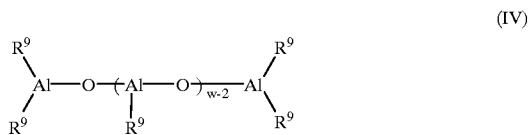

(IV)

wherein $R^9$ represents a hydrocarbon group, such as an alkyl, alkenyl, aryl or arylalkyl group having from 1 to 20, but preferably from 1 to 12 carbon atoms, or represents a halogen atom; w indicates a degree of polymerization of the compound and is generally an integer of from 3 to 50, but preferably from 7 to 40; and plural $R^9$'s may be the same or different; and cyclic aluminoxanes of a general formula (V):

(V)

wherein $R^9$ and w have the same meanings as above.

For producing those aluminoxanes, for example, an alkylaluminium may be contacted with a condensing agent such as water or the like. However, the method for producing them is not specifically defined. The aluminoxanes could be produced in any known manner. For example, (1) an organic aluminium compound is dissolved in an organic solvent, and then contacted with water; (2) an organic aluminium compound is previously added to the polymerization system that requires the catalyst comprising the component (B), and water is added to the system in later stages; (3) crystal water existing in metal salts and others, or water having adsorbed to inorganic or organic materials is reacted with an organic aluminium compound; or (4) a tetraalkyldialuminoxane is reacted with a trialkylaluminium and then with water. The aluminoxanes may be insoluble in toluene.

One or more of those aluminoxanes may be used herein either singly or as combined.

The Lewis acid for the component (B-3) is not specifically defined, and may be any of organic compounds or solid inorganic compounds. As the organic compounds, preferred are boron compounds, aluminium compounds, etc.; and as the inorganic compounds, preferred are magnesium compounds, aluminium compounds, etc. The aluminium compounds include, for example, aluminium oxide, aluminium chloride, etc.; the magnesium compounds include, for example, magnesium chloride, diethoxymagnesium, etc.; the boron compounds include, for example, triphenylboron, tris(pentafluorophenyl)boron, tris[3,5-bis(trifluoromethyl) phenyl]boron, tris[(4-fluoromethyl)phenyl]boron, trimethylboron, triethylboron, tri-n-butylboron, tris (fluoromethyl)boron, tris(pentafluoroethyl)boron, tris (nonafluorobutyl)boron, tris(2,4,6-trifluorophenyl)boron, tris(3,5-difluorophenyl)boron, tris[3,5-bis(trifluoromethyl) phenyl]boron, bis(pentafluorophenyl)fluoroboron, diphenylfluoroboron, bis(pentafluorophenyl)chloroboron, dimethylfluoroboron, diethylfluoroboron, di-n-butylfluoroboron, pentafluorophenyldifluoroboron, phenyldifluoroboron, pentafluorophenyldichloroboron, methyldifluoroboron, ethyldifluoroboron, n-butyldifluoroboron, etc.

One or more of these Lewis acids may be used herein either singly or as combined.

In the olefin polymerization catalyst, the ratio of the catalyst component (A) to the catalyst component (B) of any of compounds (B-1), (B-2) and (B-3) may be as follows: The ratio by mol of (A) to (B-1) preferably falls between 10/1 and 1/100, more preferably between 2/1 and 1/10; and the ratio by mol of (A) to (B-2) preferably falls between 1/1 and 1/1000000, more preferably between 1/10 and 1/10000.

The ratio by mol of (A) to (B-3) preferably falls between 1/0.1 and 1/2000, more preferably between 1/0.2 and 1/1000, even more preferably between 1/0.5 and 1/500. For the catalyst component (B), one or more of (B-1), (B-2) and (B-3) may be used either singly or as combined.

The olefin polymerization catalyst may comprise the components (A) and (B) as the essential components, or may comprise the components (A) and (B) and an organic aluminium compound (C) as the essential components.

As the organic aluminium compound for the component (C), employable are compounds of a general formula (VI):

$$R^{10}{}_{v}AlJ_{3-v} \tag{VI}$$

wherein $R^{10}$ represents a hydrocarbon group having from 1 to 20 carbon atoms, preferably an alkyl group having from 1 to 10 carbon atoms; J represents a hydrogen atom, an alkoxy group having from 1 to 20 carbon atoms, an aryl group having from 6 to 20 carbon atoms, or a halogen atom; and v indicates an integer of from 1 to 3.

Specific examples of the compounds of formula (VI) include trimethylaluminium, triethylaluminium, triisopropylaluminium, triisobutylaluminium, dimethylaluminium chloride, diethylaluminium chloride, methylaluminium dichloride, ethylaluminium dichloride, dimethylaluminium fluoride, diisobutylaluminium hydride, diethylaluminium hydride, ethylaluminium sesquichloride, etc.

One or more of these organic aluminium compounds may be used herein either singly or as combined.

The ratio by mol of the catalyst component (A) to the catalyst component (C) preferably falls between 1/1 and 1/10000, more preferably between 1/5 and 1/2000, even more preferably between 1/10 and 1/1000. Adding the component (C) to the catalyst enhances the polymerization activity/transition metal of the catalyst. However, if too much, the organic aluminium compound for (C) will be useless, and, in addition, a large amount of the compound will unfavorably remain in the polymer produced.

In the olefin polymerization catalyst, at least one of the catalyst components may be held on a suitable carrier. The type of the carrier is not specifically defined. Herein employable is any of inorganic oxide carriers, other inorganic carriers and organic carriers, but preferred are inorganic oxide carriers and other inorganic carriers.

Concretely, the inorganic oxide carriers include $SiO_2$, $Al_2O_3$, MgO, $ZrO_2$, $TiO_2$, $Fe_2O_3$, $B_2O_3$, CaO, ZnO, BaO, $ThO_2$ and their mixtures, for example, silica-alumina, zeolite, ferrite, glass fibers, etc. Of those, especially preferred are $SiO_2$ and $Al_2O_3$. The inorganic oxide carriers may contain minor carbonates, nitrates, sulfates, etc.

As other carriers also usable herein, mentioned are magnesium compounds of a general formula, $MgR^{11}{}_{x}X^{2}{}_{y}$, such as typically $MgCl_2$, $Mg(OC_2H_5)_2$, etc., as well as their complexes, etc. In the formula, $R^{11}$ represents an alkyl group having from 1 to 20 carbon atoms, an alkoxy group having from 1 to 20 carbon atoms, or an aryl group having from 6 to 20 carbon atoms; $X^2$ represents a halogen atom, or an alkyl group having from 1 to 20 carbon a toms; x falls between 0 and 2, y falls between 0 and 2, and x+y=2. Plural $R^{11}$'s and also plural $X^2$'s, if any, may be the same or different.

The organic carriers usable herein include polymers such as polystyrenes, styrene-divinylbenzene copolymers, polyethylenes, polypropylenes, substituted polystyrenes, polyarylates, etc.; as well as starch, carbon compounds, etc.

Olefins to be polymerized according to the method of the invention are α-olefins having from 2 to 20 carbon atoms, to which may be added diene compounds, cyclic olefins, etc., if desired.

The α-olefins having from 2 to 20 carbon atoms include ethylene, propylene, 1-butene, 1-pentene, 4-methyl-1-pentene, 1-hexene, 1-octene, 1-decene, 1-dodecene, 1-tetradecene, 1-octadecene, 1-eicosene, etc. One or more of these α-olefins may be used either singly or as combined.

The invention is favorable to homopolymerization of propylene or ethylene, or to copolymerization of ethylene and propylene. It is especially favorable to homopolymerization of propylene.

The polymerization mode in the method for producing olefin polymers of the invention is not specifically defined, and employable is any of slurry polymerization, vapor-phase polymerization, bulk polymerization, solution polymerization, suspension polymerization, etc. Preferred are modes of solution polymerization and suspension polymerization; and more preferred is solution polymerization.

Regarding the polymerization condition, the polymerization temperature generally falls between −100 and 250° C, but preferably between −50 and 200° C., more preferably between 0 and 130° C. Regarding the ratio of the catalyst to be used, relative to the starting material, it is desirable that the ratio of starting monomer/transition metal compound, by mol, falls between 1 and $10^8$, more preferably between 100 and $10^5$. If the molar ratio of starting monomer/transition metal compound oversteps the range, the reactor efficiency will be low and the polymerization activity/transition metal will also be low. The polymerization time generally falls between 5 minutes and 10 hours; and the reaction pressure preferably falls between normal pressure and 200 kg/cm²G, more preferably between normal pressure and 100 kg/cm²G.

For controlling the molecular weight of the polymer to be produced, for example, the type of each catalyst component, the amount of the catalyst to be used, and the polymerization temperature may be suitably selected.

A polymerization solvent may be used herein. It includes, for example, aromatic hydrocarbons such as benzene, toluene, xylene, ethylbenzene, etc.; alicyclic hydrocarbons such as cyclopentane, cyclohexane, methylcyclohexane, etc.; aliphatic hydrocarbons such as pentane, hexane, heptane, octane, etc.; halogenohydrocarbons such as chloroform, dichloromethane, etc. One or more of these solvents may be used either singly or as combined. As the case may be, monomers of α-olefins may be used as the solvent. The polymerization may be effected in the absence of a solvent.

EXAMPLES

The invention is described in more detail with reference to the following Examples, which, however, are not intended to restrict the scope of the invention.

Example 1-1

400 ml of toluene and 1 mmol of triisobutylaluminium were put into a 1.5 liters autoclave that had been fully dried under heat in vacuum and purged with nitrogen, in a nitrogen stream at room temperature. The mixture was heated up to 50° C. with stirring it at 500 rpm. To this were added 0.5 $\mu$mols of (1,2'-ethylene)(2,1'-ethylene)-bis(3-methylindenyl)zirconium dichloride and then 1 $\mu$mol of a boron compound of [PhNMe$_2$H][(C$_6$F$_5$)$_4$B] in that order.

This was kept as such for 5 minutes, and propylene was introduced thereinto through a propylene-introducing line, along with 454 $\mu$mols of hydrogen that had been previously put into the line. The pressure in the autoclave was increased up to 7 kg/cm$^2$G, under which the monomer was polymerized.

After the polymerization was effected for 20 minutes at the temperature of 50° C. and under the pressure of 7.0 kg/cm$^2$G, the autoclave was degassed, purged with nitrogen and cooled to stop the polymerization.

Next, the reaction mixture was poured into methanol, washed with methanol, and filtered. The resulting residue was dried under reduced pressure to obtain 214.3 g of polypropylene.

The catalyst activity was 14097 kg/g-Zr·hr. The polymer had [η]=0.20 dl/g, and its melting point was 97.8° C.

Examples 1-2 and 1-3

The same process as in Example 1-1 was repeated, except that the amount of hydrogen and that of the transition metal compound were varied to those as in Table 1. The data and the results are in Table 1.

Comparative Example 1

The same process as in Example 1-1 was repeated, except that the amount the transition metal compound and that of the catalyst promoter were varied to those as in Table 1. In this, however, hydrogen was not added to the polymerization system. The data and the results are in Table 1.

Example 2-1

400 ml of toluene and 2 mmols of methylaluminoxane were put into a 1.5 liters autoclave that had been fully dried under heat in vacuum and purged with nitrogen, in a nitrogen stream at room temperature. The mixture was heated up to 50° C. with stirring it at 500 rpm. To this was added 1 $\mu$mol of (1,2'-ethylene)(2,1'-ethylene)-bis(3-methylindenyl) zirconium dichloride.

This was kept as such for 5 minutes, and propylene was introduced thereinto through a propylene-introducing line, along with 250 $\mu$mols of hydrogen that had been previously put into the line. The pressure in the autoclave was increased up to 7 kg/cm$^2$G, under which the monomer was polymerized.

After the polymerization was effected for 20 minutes at the temperature of 50° C. and under the pressure of 7.0 kg/cm$^2$G, the autoclave was degassed, purged with nitrogen and cooled to stop the polymerization.

Next, the reaction mixture was poured into methanol, washed with methanol, and filtered. The resulting residue was dried under reduced pressure to obtain 163.5 g of polypropylene.

The catalyst activity was 5378 kg/g-Zr·hr. The polymer had [η]=0.69 dl/g, and its melting point was 97.4° C.

Example 2-2

The same process as in Example 2-1 was repeated, except that the amount of hydrogen was varied to that as in Table 1. The data and the results are in Table 1.

Comparative Example 2

The same process as in Example 2-1 was repeated. In this, however, hydrogen was not added to the polymerization system. The data and the results are in Table 1.

Examples 3-1 to 3-3

The same process as in Example 2-1 was repeated, except that the transition metal compound, the polymerization time and the amount of hydrogen were varied to those as in Table 1. The data and the results are in Table 1.

Comparative Example 3

The same process as in Example 3-1 was repeated. In this, however, hydrogen was not added to the polymerization system. The data and the results are in Table 1.

TABLE 1

| | Main Catalyst (A) | Amount of (A) added $\mu$mol | Catalyst Promoter (B) | Amount of (B) added $\mu$mol | Amount of (C) added mmol | Amount of Hydrogen added $\mu$mol | Hydrogen Concentration mol % | Hydrogen /Zr in (A) | Catalyst Activity kg-PP/g-Zr·hr | Activity Ratio (with hydrogen/ with no hydrogen) | [η] dl/g | Melting Point Tm ° C. | Polymerization Temperature (° C.)/Polymerization Time (min) |
|---|---|---|---|---|---|---|---|---|---|---|---|---|---|
| Ex. 1-1 | A-1 | 0.50 | B-1 | 1.0 | 1.0 | 454 | 0.16 | 908 | 14097 | 16.2 | 0.20 | 97.8 | 500° C. /20 min |
| Ex. 1-2 | A-1 | 0.25 | B-1 | 0.5 | 1.0 | 454 | 0.16 | 1816 | 15095 | 17.3 | 0.30 | 100.8 | |
| Ex. 1-3 | A-1 | 0.50 | B-1 | 2.0 | 1.0 | 2000 | 0.71 | 4000 | 9956 | 11.4 | 0.17 | 93.2 | |
| Comp. Ex. 1 | A-1 | 1.00 | B-1 | 2.0 | 1.0 | 0 | 0 | 0 | 871 | — | 0.36 | 103.9 | |
| Ex. 2-1 | A-1 | 1.00 | B-2 | 2000 | — | 250 | 0.09 | 250 | 5378 | 18.5 | 0.69 | 97.4 | |
| Ex. 2-2 | A-1 | 1.00 | B-2 | 2000 | — | 681 | 0.24 | 681 | 5260 | 18.0 | 0.42 | 95.5 | |
| Comp. Ex. 2 | A-1 | 1.00 | B-2 | 2000 | — | 0 | 0 | 0 | 291 | — | 0.65 | 102.0 | |
| Ex. 3-1 | A-2 | 2.00 | B-2 | 2000 | — | 4000 | 1.7 | 2000 | 2520 | 5.5 | 0.51 | 143.3 | 50° C. |

TABLE 1-continued

| | Main Catalyst (A) | Amount of (A) added μmol | Catalyst Promoter (B) | Amount of (B) added μmol | Amount of (C) added mmol | Amount of Hydrogen added μmol | Hydrogen Concentration mol % | Hydrogen /Zr in (A) | Catalyst Activity kg-PP/g-Zr.hr | Activity Ratio (with hydrogen/with no hydrogen) | [η] dl/g | Melting Point Tm °C. | Polymerization Temperature (°C.)/Polymerization Time (min) |
|---|---|---|---|---|---|---|---|---|---|---|---|---|---|
| Ex. 3-2 | A-2 | 2.00 | B-2 | 2000 | — | 8000 | 3.3 | 4000 | 3147 | 6.9 | 0.44 | 142.6 | /15 min |
| Ex. 3-3 | A-2 | 2.00 | B-2 | 2000 | — | 20000 | 8.3 | 10000 | 3658 | 8.0 | 0.35 | 140.7 | |
| Comp. Ex. 3 | A-2 | 2.00 | B-2 | 2000 | — | 0 | 0 | 0 | 456 | — | 0.75 | 144.5 | |

A-1: (1,2'-ethylene) (2,1'-ethylene)-bis(3-methylindenyl)zirconium dichloride.
A-2: (1,2'-ethylene) (2,1'-ethylene)-bis(4,7-dimethylindenyl)zirconium dichloride.
B-1:[PhNMe$_2$H][(C$_6$H$_5$)$_4$B].
B-2: methylaluminoxane.
(C): TIBA Industrial Applicability The invention comprises simple treatment of adding a small amount of hydrogen to a specific double-crosslinked metallocene-type catalyst for olefin polymerization, by which the polymerization activity of the catalyst is greatly enhanced several times or more, as compared with that of the catalyst to which no hydrogen is added. Therefore, in the invention, the catalyst exhibits extremely high polymerization activity. The invention is favorable to olefin polymer production, especially to propylene polymer production.

What is claimed is:

1. A method for producing olefin polymers by polymerizing an olefin in the presence of a metallocene catalyst, which comprises (A) a double-crosslinked transition metal compound having a structure of formula (I):

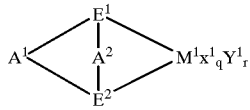

(I)

where
M$^1$ represents a metal element of Group 4 of the Periodic Table;
E$^1$ and E$^2$ each represent a ligand of an indenyl or substituted indenyl group, and form a crosslinked structure via A$^1$ and A$^2$, and E$^1$ and E$^2$ may be the same or different;
X$^1$ represents a σ-bonding ligand, and plural X$^1$'s, if any, may be the same or different;
Y$^1$ represents a Lewis base;
A$^1$ and A$^2$ each represent a crosslinking group, and they may be the same or different, but at least one of them is a hydrocarbon group;
q represents an integer of 1 or 2, and r represents 0 or 1, and (B) a compound which reacts with the transition metal compound (A) to form an ionic complex; wherein the polymerization system is so controlled that the hydrogen concentration in the olefin therein ranges from 0.01 to 10 mol. %, thereby effecting significant enhancement in the polymerization activity of the catalyst system by a factor of at least 5.5 times over the activity of the catalyst in polymerization conducted in the absence of hydrogen.

2. A method for producing olefin polymers by polymerizing an olefin in the presence of a metallocene catalyst, which comprises (A) a double-crosslinked transition metal compound having a structure of formula (I):

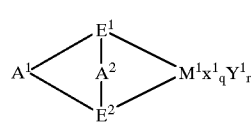

(I)

where
M$^1$ represents a metal element of Group 4 of the Periodic Table;
E$^1$ and E$^2$ each represent a ligand of an indenyl or substituted indenyl group, and form a crosslinked structure via A$^1$ and A$^2$, and E$^1$ and E$^2$ may be the same or different;
X$^1$ represents a σ-bonding ligand, and plural X$^1$'s, if any, may be the same or different;
Y$^1$ represents a Lewis base;
A$^1$ and A$^2$ each represent a crosslinking group, and they may be the same or different, but at least one of them is a hydrocarbon group;
q represents an integer of 1 or 2, and r represents 0 or 1, and (B) a compound which reacts with the transition metal compound (A) to form an ionic complex; wherein hydrogen is added to the polymerization system in an amount ranging from 10 to 20000 mols. relative to one mol. of the transition metal in the transition metal compound, thereby effecting significant enhancement in the polymerization activity of the catalyst system by a factor of at least 5.5 times over the activity of the catalyst in polymerization conducted in the absence of hydrogen.

3. A method for producing olefin polymers by polymerizing an olefin in the presence of a metallocene catalyst, which comprises (A) a double-crosslinked transition metal compound having a structure of formula (I):

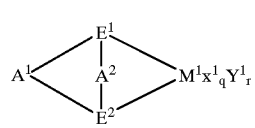

(I)

where
M$^1$ represents a metal element of Group 4 of the Periodic Table;

$E^1$ and $E^2$ each represent a ligand of an indenyl or substituted indenyl group, and form a crosslinked structure via $A^1$ and $A^2$, and $E^1$ and $E^2$ may be the same or different;

$X^1$ represents a σ-bonding ligand, and plural $X^1$'s, if any, may be the same or different;

$Y^1$ represents a Lewis base;

$A^1$ and $A^2$ each represent a crosslinking group, and they may be the same or different, but at least one of them is a hydrocarbon group;

q represents an integer of 1 or 2, and r represents 0 or 1, and (B) a compound which reacts with the transition metal compound (A) to form an ionic complex, and in the presence of from 0.01 to 10 mol. %, relative to the amount of the olefin present in the reaction system, of hydrogen, thereby effecting significant enhancement in the polymerization activity of the catalyst system by a factor of at least 5.5 times over the activity of the catalyst in polymerization conducted in the absence of hydrogen.

4. A method for producing olefin polymers by polymerizing an olefin in the presence of a metallocene catalyst, which comprises (A) a double-crosslinked transition metal compound having a structure of formula (I):

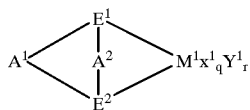

(I)

where $M^1$ represents a metal element of Group 4 of the Periodic Table;

$E^1$ and $E^2$ each represent a ligand of an indenyl or substituted indenyl group, and form a crosslinked structure via $A^1$ and $A^2$, and $E^1$ and $E^2$ may be the same or different;

$X^1$ represents a σ-bonding ligand, and plural $X^1$'s, if any, may be the same or different;

$Y^1$ represents a Lewis base;

$A^1$ and $A^2$ each represent a crosslinking group, and they may be the same or different, but at least one of them is a hydrocarbon group;

q represents an integer of 1 or 2, and r represents 0 or 1, and (B) a compound which reacts with the transition metal compound (A) or its derivative to form an ionic complex, and in the presence of from 10 to 20000 mols., relative to one mol. of the transition metal in the transition metal compound, of hydrogen, thereby effecting significant enhancement in the polymerization activity of the catalyst system by a factor of at least 5.5 times over the activity of the catalyst in polymerization conducted in the absence of hydrogen.

5. The method for producing olefin polymers as claimed in claim 1, wherein $E^1$ and $E^2$ in formula (I) are substituted indenyl groups.

6. The method for producing olefin polymers as claimed in claim 1, wherein $A^1$ and $A^2$ in formula (I) are hydrocarbon groups.

7. The method for producing olefin polymers as claimed in claim 1, wherein the metallocene catalyst further contains (C) an organic aluminum compound in addition to the components (A) and (B).

8. The method for producing olefin polymers as claimed in claim 1, wherein the organic aluminum compound is represented by the formula (VI):

$$R^{10}{}_v AlJ_{3-v} \qquad (VI)$$

wherein $R^{10}$ represents a hydrocarbon group having from 1 to 20 carbon atoms;

J represents a hydrogen atom, an alkoxy group having from 1 to 20 carbon atoms, an aryl group having from 6 to 20 carbon atoms, or a halogen atom; and v indicates an integer of from 1 to 3.

9. The method for producing olefin polymers as claimed in claim 2, wherein $E^1$ and $E^2$ in formula (I) are substituted idenyl groups.

10. The method for producing olefin polymers as claimed in claim 3, wherein $E^1$ and $E^2$ in formula (I) are substituted idenyl groups.

11. The method for producing olefin polymers as claimed in claim 4, wherein $E^1$ and $E^2$ in formula (I) are substituted idenyl groups.

12. The method for producing olefin polymers as claimed in claim 2, wherein $A^1$ and $A^2$ in formula (I) are hydrocarbon groups.

13. The method for producing olefin polymers as claimed in claim 3, wherein $A^1$ and $A^2$ in formula (I) are hydrocarbon groups.

14. The method for producing olefin polymers as claimed in claim 4, wherein $A^1$ and $A^2$ in formula (I) are hydrocarbon groups.

15. The method for producing olefin polymers as claimed in claim 2, wherein the metallocene-type catalyst further contains (C) an organic aluminum compound in addition to the components (A) and (B).

16. The method for producing olefin polymers as claimed in claim 3, wherein the metallocene catalyst further contains (C) an organic aluminum compound in addition to the components (A) and (B).

17. The method for producing olefin polymers as claimed in claim 4, wherein the metallocene catalyst further contains (C) an organic aluminum compound in addition to the components (A) and (B).

18. The method for producing olefin polymers as claimed in claim 5, wherein the metallocene-type catalyst further contains (C) an organic aluminum compound in addition to the components (A) and (B).

19. The method for producing olefin polymers as claimed in claim 2, wherein the metallocene catalyst further contains (C) an organic aluminum compound in addition to the components (A) and (B).

20. The method for producing olefin polymers as claimed in claim 2, wherein the organic aluminium compound is represented by the general formula (VI):

$$R^{10}{}_v AlJ_{3-v} \qquad (VI)$$

wherein $R^{10}$ represents a hydrocarbon group having from 1 to 20 carbon atoms;

J represents a hydrogen atom, an alkoxy group having from 1 to 20 carbon atoms, an aryl group having from 6 to 20 carbon atoms, or a halogen atom; and v indicates an integer of from 1 to 3.

21. The method for producing olefin polymers as claimed in claim 3, wherein the organic aluminium compound is represented by the general formula (VI):

$$R^{10}{}_v AlJ_{3-v} \qquad (VI)$$

wherein
  $R^{10}$ represents a hydrocarbon group having from 1 to 20 carbon atoms;
  J represents a hydrogen atom, an alkoxy group having from 1 to 20 carbon atoms, an aryl group having from 6 to 20 carbon atoms, or a halogen atom; and
  v indicates an integer of from 1 to 3.

22. The method for producing olefin polymers as claimed in claim 4, wherein the organic aluminium compound is represented by the general formula (VI):

$$R^{10}{}_v AlJ_{3-v} \qquad (VI)$$

wherein
  $R^{10}$ represents a hydrocarbon group having from 1 to 20 carbon atoms;
  J represents a hydrogen atom, an alkoxy group having from 1 to 20 carbon atoms, an aryl group having from 6 to 20 carbon atoms, or a halogen atom; and
  v indicates an integer of from 1 to 3.

23. The method for producing olefin polymers as claimed in claim 5, wherein the organic aluminium compound is represented by the general formula (VI):

$$R^{10}{}_v AlJ_{3-v} \qquad (VI)$$

wherein
  $R^{10}$ represents a hydrocarbon group having from 1 to 20 carbon atoms;
  J represents a hydrogen atom, an alkoxy group having from 1 to 20 carbon atoms, an aryl group having from 6 to 20 carbon atoms, or a halogen atom; and
  v indicates an integer of from 1 to 3.

24. The method for producing olefin polymers as claimed in claim 6, wherein the organic aluminium compound is represented by the general formula (VI):

$$R^{10}{}_v AlJ_{3-v} \qquad (VI)$$

wherein
  $R^{10}$ represents a hydrocarbon group having from 1 to 20 carbon atoms;
  J represents a hydrogen atom, an alkoxy group having from 1 to 20 carbon atoms, an aryl group having from 6 to 20 carbon atoms, or a halogen atom; and
  v indicates an integer of from 1 to 3.

25. The method of claim 8, wherein $R^{10}$ represents an alkyl group having from 1 to 10 carbon atoms.

26. The method for producing olefin polymers as claimed in claim 1, wherein said polymerization activity is enhanced by a factor of 5.5 to 18.5.

27. The method for producing olefin polymers as claimed in claim 2, wherein said polymerization activity is enhanced by a factor of 5.5 to 18.5.

28. The method for producing olefin polymers as claimed in claim 3, wherein said polymerization activity is enhanced by a factor of 5.5 to 18.5.

29. The method for producing olefin polymers as claimed in claim 4, wherein said polymerization activity is enhanced by a factor of 5.5 to 18.5.

* * * * *